United States Patent
Lin

(10) Patent No.: US 7,136,682 B2
(45) Date of Patent: Nov. 14, 2006

(54) PORTABLE ELECTRONIC SYSTEM EQUIPPED WITH A SPARE BATTERY DEVICE

(75) Inventor: Chien-Min Lin, Shindian (TW)

(73) Assignee: High Tech Computer, Corp., Taoyuan (TW)

( * ) Notice: Subject to any disclaimer, the term of this patent is extended or adjusted under 35 U.S.C. 154(b) by 443 days.

(21) Appl. No.: 10/263,667

(22) Filed: Oct. 4, 2002

(65) Prior Publication Data

US 2003/0069050 A1    Apr. 10, 2003

(30) Foreign Application Priority Data

Oct. 5, 2001    (TW) .............................. 90124764 A

(51) Int. Cl.
*H04B 1/38*    (2006.01)
*H04M 1/00*    (2006.01)

(52) U.S. Cl. .................. 455/575.1; 455/572; 455/90.1; 455/347; 455/343.1; 320/114; 320/106

(58) Field of Classification Search ................ 455/572, 455/575.1, 573, 574, 575.3, 575.4, 575.8, 455/90.1, 90.2, 90.3, 343.1, 343.6, 347, 348; 320/106, 110, 113, 114; 429/96–100
See application file for complete search history.

(56) References Cited

U.S. PATENT DOCUMENTS 5,172,043 A * 12/1992 Toops .......................... 320/106
5,563,493 A * 10/1996 Matsuda et al. ............. 320/124
6,023,147 A *  2/2000 Cargin et al. ................ 320/114
6,285,159 B1 *  9/2001 Ki et al. ....................... 320/112
2004/0076875 A1 *  4/2004 Maggert et al. ............ 429/123

FOREIGN PATENT DOCUMENTS

EP          0511740 A1        11/1992

* cited by examiner

*Primary Examiner*—Edan Orgad
(74) *Attorney, Agent, or Firm*—Rabin & Berdo P.C.

(57) ABSTRACT

A portable electronic system equipped with a spare battery device. The portable electronic system includes a spare battery device and a portable device. The spare battery device includes a first fixer unit, a power storage unit and a sensory control unit. The sensory control unit further includes a constant voltage source, a resistor, a resilient object, output contact pads, and a control unit. The portable device includes a second fixer unit, a covering, and input contact pads. By adjusting the coupling relationship between the first fixer unit and the second fixer unit, each output contact pad can be coupled to the associated input contact pads; and the control unit is for controlling output power of the spare battery device.

12 Claims, 4 Drawing Sheets

PORTABLE ELECTRONIC SYSTEM EQUIPPED WITH A SPARE BATTERY DEVICE

This application incorporates by reference Taiwan application Serial No. 090124764, filed Oct. 5, 2001.

BACKGROUND OF THE INVENTION

1. Field of the Invention

This invention relates to a portable electronic system, and more particularly to a portable electronic system equipped with a spare battery device.

2. Description of the Related Art

The rapid development of digital electronic products makes people's life more convenient. And a lot of portable devices, such as mobile phones, notebooks, or Personal Digital Assistance (PDA), and so on, have been developed rapidly. It highly promotes the convenience of people's life and the efficiency of work. Portable devices, in the circumstance without an external power source, totally rely on batteries to supply the necessary operating power. It is, therefore, very important for the portable devices to have a stable power source supplied.

When a battery has been used for a certain period of time, the battery will not be able to stably supply necessary power to a portable device. Therefore, it is necessary to provide a new battery as a new power source of the portable device.

Besides, it is necessary for a spare battery to have a power-leakage-protection appliance to avoid power leakage when the spare battery is in an idle status. In the present time, a switch is used to be the power-leakage-protection appliance to achieve the goal. That is, a switch is installed into a battery. When the battery is in an idle status, the switch is turned off manually to disable the battery from supplying power. When the battery is needed, the switch is turned on manually to enable the battery for supplying power.

There are some disadvantages using the switch as the power-leakage-protection appliance, which are: (1) the cost of manufacturing and the volume of the portable device increase because a switch is needed; (2) a user may forget to turn off an idle battery due to the manual operation of changing the statuses of the switch. If, at this moment, the positive and negative electrodes of that battery are incidentally conducted, for example, there is just a conductor conducting the positive and negative electrodes, the power of the battery will start to leak out.

SUMMARY OF THE INVENTION

It is therefore an object of the invention to provide a portable electronic system equipped with a spare battery device. When the power of the presently used battery is running out, it is very convenient to use a spare battery as a new power supply of a portable device. And the spare battery can release power only when it is coupled to the portable device physically. It is therefore able to solve the power leakage problem of the idle spare battery.

The invention achieves the above-identified objects by providing a portable electronic system equipped with a spare battery device. The portable electronic system includes a spare battery device and a portable device. The spare battery device includes at least a first fixer unit, a power storage unit for storing power, and a sensory control unit, which is coupled to the power storage unit. The sensory control unit further includes at least a power supply, a resistor coupled to the power supply, a resilient object, and a control unit. The resilient object is electrically conductive, coupled to the resistor at the first node, and protruding out from the spare battery device. The control unit is coupled to the resistor and the resilient object at the first node, and is coupled to the power storage unit. The control unit is equipped with input contact pads, which are for outputting power from the spare battery device.

The portable device, which is coupled to a spare battery device, includes at least a second fixer unit, a covering, and input contact pads. The second fixer unit, which is coupled to the first fixer unit for fastening the spare battery to the portable device. The covering is electrically conductive. In addition, the covering has a protrusion, which protrudes out on the portable device at the location associated with the location of the resilient object on the spare battery device. The input contact pads are for receiving power from the spare battery device. The location of every input contact pad on the spare battery device is associated with the location of output contact pads on the portable device.

By adjusting the coupling relationship between the first fixer unit and the second fixer unit, the resilient object can touch the protrusion, and every output contact pad can be coupled to every associated input contact pad. The control unit outputs the power from the spare battery device according to the voltage of the first node,

BRIEF DESCRIPTION OF THE DRAWINGS

Objects, features, and advantages of the invention will become apparent from the following detailed description of the preferred but non-limiting embodiments. The description is made with reference to the accompanying drawings, in which.

DESCRIPTION OF THE PREFERRED EMBODIMENT

Figure 1A:
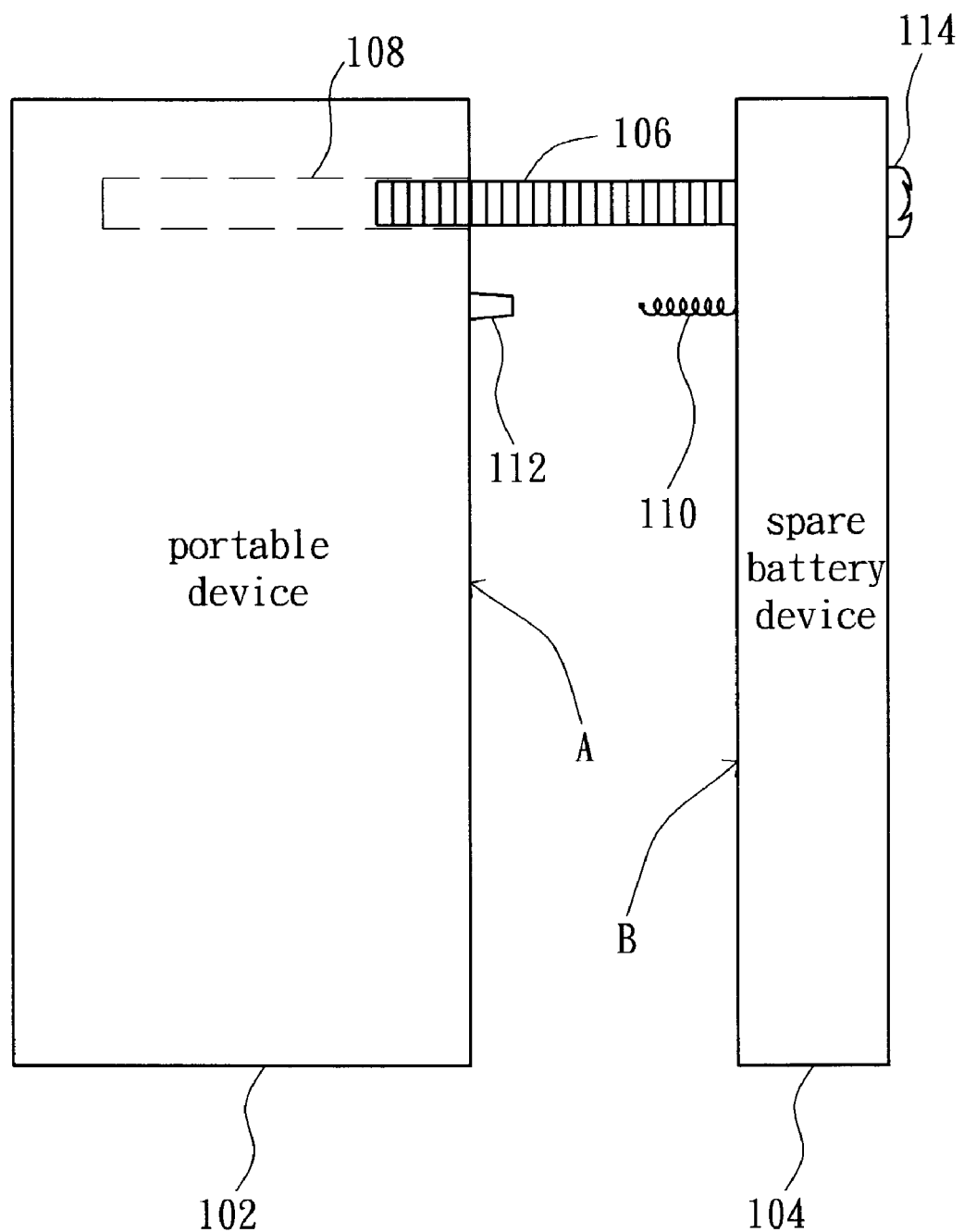
FIG. 1A illustrates a side view of a portable electronic system 100 equipped with a spare battery device 104 according to the invention.

FIG. 1A illustrates a side view of a portable electronic system equipped with the spare battery device 100 according to the invention. The feature of the present invention is that only when the spare battery device 104 physically coupled to the portable device 102, which means that the spare battery device 104 is used as the power source of the portable device 102, the storing power of the spare battery device 104 can be outputted to the portable device 102. When the power of the presently used battery runs out, the user can conveniently use the spare battery device 104 as a new power source of the portable device 102. And it is not easy for the spare battery device 104 in the idle status to leak out the storing power due to the external factors. The spare battery device 104 includes a first fixer unit 106; and the portable device 102 includes a second fixer unit 108. The spare battery device 104 can be coupled to the portable device 102 by coupling the first fixer unit 106 and the second fixer unit 108. As FIG. 1A shows, the first fixer unit 106 of the spare battery device 104 is a screw having a thread. And there is a knob 114 at the bottom of the screw 106. Moreover, the second fixer unit 108 of the portable device 102 is a nut. The nut 108 has a thread as well in order to turn the screw 106 fastened to the nut 108.

In addition, the portable device 102 includes an electrically conductive covering, on which there is a protrusion 112. And the spare battery device 104 includes an electrically conductive resilient object 110. In FIG. 1A, the resilient object is a spring. The spring 110 protrudes out from the bottom plate B of the spare battery device 104. And the spring is located on the bottom plate B at the location associated with the location of the protrusion 112 on the bottom plate A.

Figure 1C:
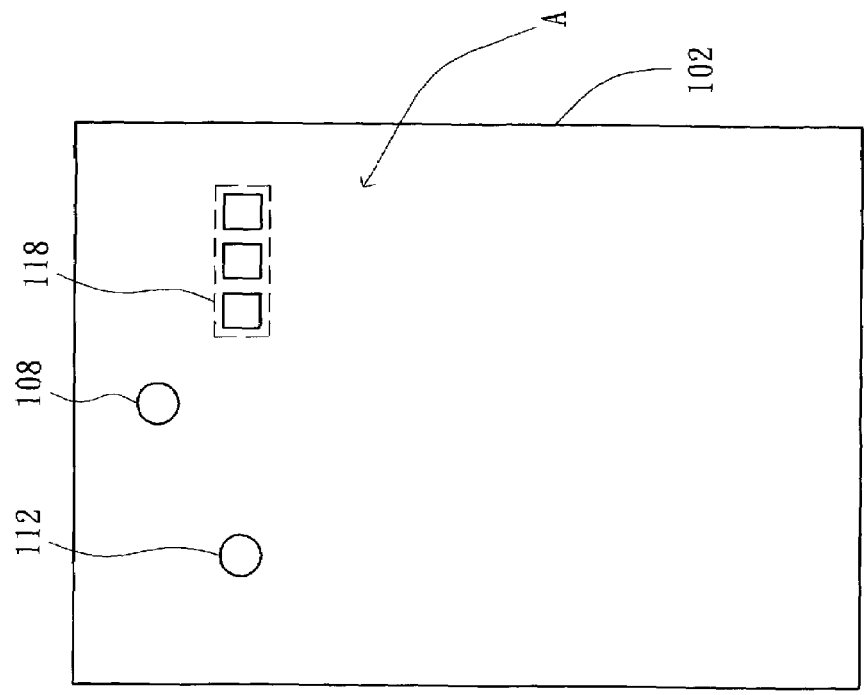
FIG. 1C is an illustration of a bottom plate A of a portable device 102 according to the invention.
Figure 1B:
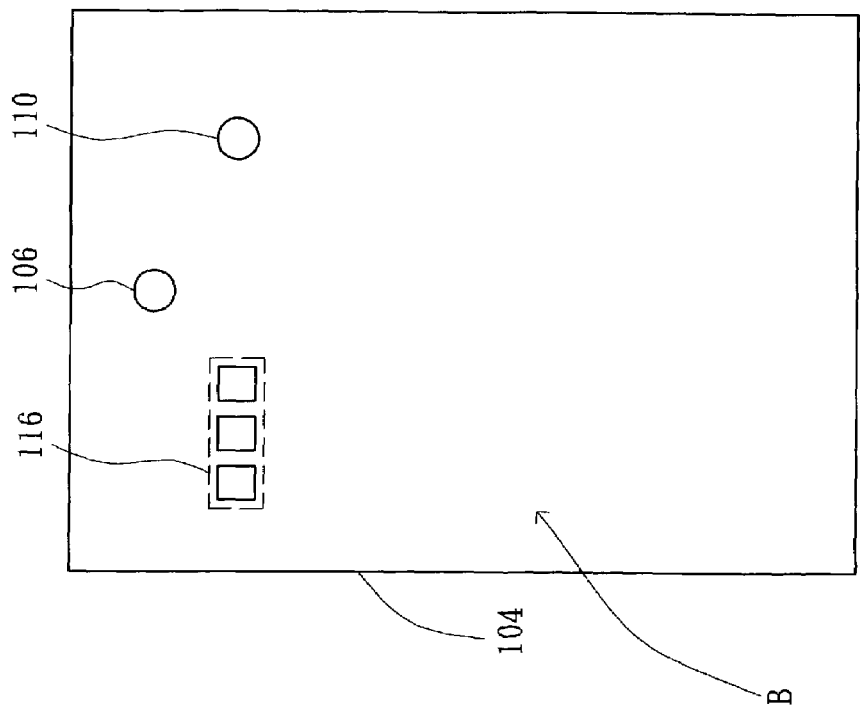
FIG. 1B is an illustration of a bottom plate B of a spare battery device 104 according to the invention.

FIG. 1B shows the illustration of the bottom plate B of the spare battery device 104 according to the present invention. On the bottom plate B, there are not only the screw 106 and the spring 110, but also output contact pads 116. The power stored in the spare battery device 104 is outputted via the output contact pads 116. FIG. 1C illustrates the bottom plate A of the portable device 102 according to the present invention. On the bottom plate A, there are not only the nut 108 and the protrusion 112, but also input contact pads 118. Power is inputted into the portable device 102 via those input contact pads 118. Every output contact pad 116 on the bottom plate B of the spare battery device 104 is located at the position associated with the position of every input contact pads 118 on the bottom plate A of the portable device 102.

Figure 2A:
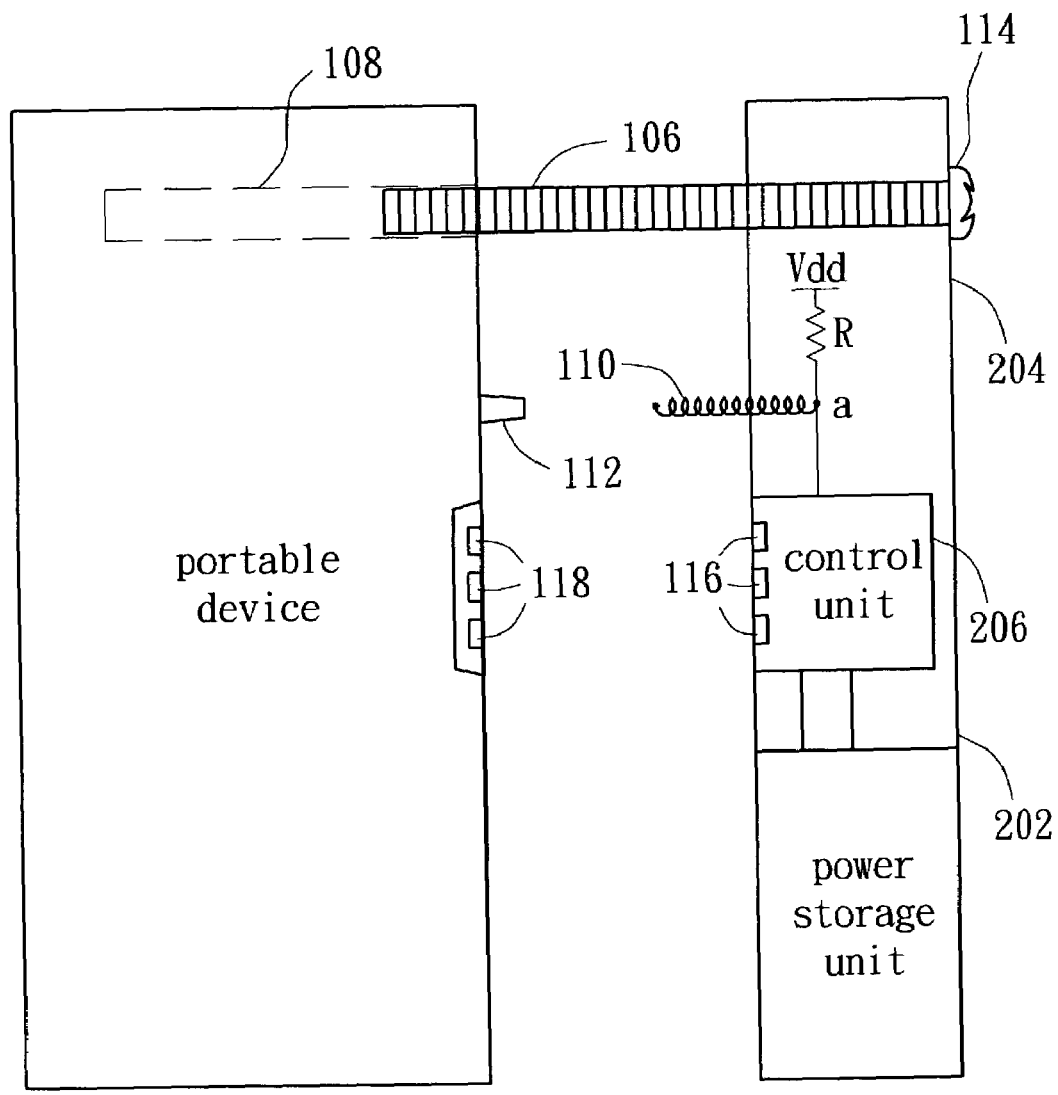
FIG. 2A is an illustration of the portable electronic system 100 when the portable device 102 uses an ordinary battery device as the power source.

FIG. 2A is the illustration of the portable electronic system 100 when the embedded battery is used as the power source of the portable device 102. The spare battery device 104 according to the present invention includes a power storage unit 202 and a sensory control unit 204. The power storage unit is for storing power; and the sensory control unit 204 is for controlling the power stored in the spare battery device 104 to be outputted to the portable device 102 when the spare battery device 104 is used as a new power source of the portable device 102. The sensory control unit 204 includes a constant voltage source Vdd, a resistor R coupled to the constant voltage source Vdd, a spring 110, and a control unit 206. The spring 110 is coupled to the resistor R at the node a, and also protrudes out from the bottom plate B of the spare battery device 104. The control unit 206 is respectively coupled to the resistor R and the spring 110 at the node a, and is also coupled to the power storage unit 202. In addition, as FIG. 1B shows, the output contact pads 116 are equipped on the surface of the control unit 206.

The control unit 206 can detect the voltage of the node a, and accordingly control the power output of the spare battery device 104. The control method is described as following. When the embedded battery is used as the power source of the portable device 102, the screw 106 can fasten the spare battery device 104 to the portable device 102, but let the protruding spring 110 on the bottom plate B of the spare battery device 104 not connect with the protrusion 112 on the bottom plate A of the portable device 102. In this situation, the voltage of the node a is equal to the output voltage of the constant voltage source Vdd. The control unit 206 does not output the power stored in the power storage unit 202 via the output contact pads 116 since the voltage of the node a is equal to Vdd.

Figure 2B:
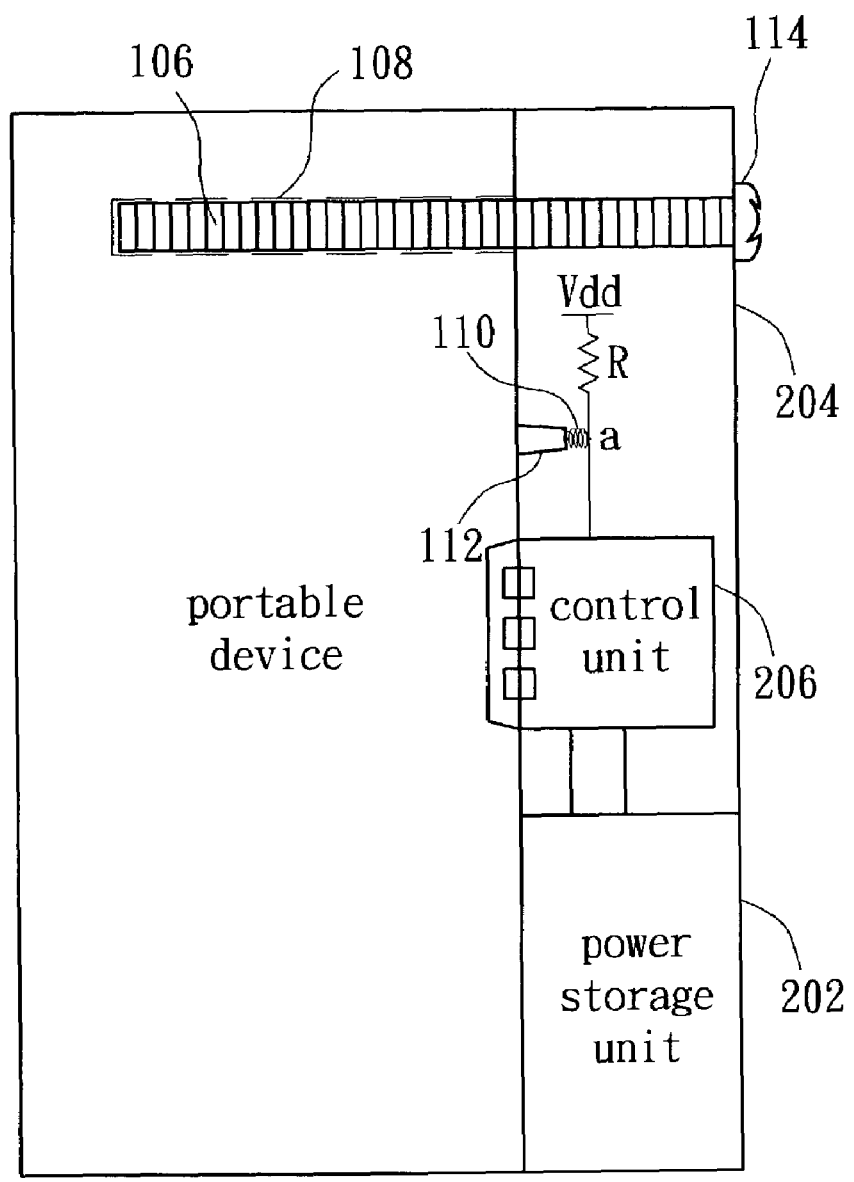
FIG. 2B is an illustration of the portable electronic system 100 when the portable device 102 uses a spare battery device 104 as the power source.

FIG. 2B is an illustration of the portable electronic system 100 when the spare battery device 104 is used as the power source of the portable device 102. When the spare battery device 104 is used as one of the power source of the portable device 102, the user can screw the screw 106 into the nut 108 by turning the knob 114. By turning the knob 114, the bottom plate A of the portable device 102 will be closer and closer to the bottom plate B of the spare battery device 104 until both of them are coupled to each other. Then, the spring 110 protruding out from the bottom plate B can be connected with the protrusion 112, and each output contact pads 116 of the spare battery device 104 can be coupled to the associated input contact pads 118 of the portable device 102.

When the spring 110 connects with the protrusion 112, the voltage of the node a will drop due to the electrically conduction of the covering of the portable device 102, (At this moment, the node a can be supposed to connect to the ground.) According to the low voltage of the node a, the control unit 206 can control the power output from the power storage unit 202 to be inputted into the portable device 102 via the output contact pads 116 and the input contact pads 18. Therefore, the portable device 102 can use the spare battery device 104 as the auxiliary power source to maintain the operation of the portable device 102.

The above-mentioned portable device 102 can be a mobile phone, a notebook, a Personal Digital Assistance (PDA), or other portable electronic devices. Basically, this invention can be applied to any portable device 102 with an electrically conductive covering.

The above embodiment reveals that the invention, a portable electronic system equipped with a spare battery device, uses fixer units to couple a spare battery device with the portable device. It is very convenient for a user to physically and electrically couple the spare battery to the portable device and to use a spare battery as a new power supply of the portable device. Beside, only when the spare battery detects that it has connected with the portable device, will the power stored in the spare battery outputted to the portable device. Therefore, the conventional power leakage problem can be solved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electronic system comprising:
   a spare battery device, the spare battery device at least comprising:
      a first fixer unit;
      a plurality of output contact pads for outputting power from the spare battery device; and
      a resilient object protruding out from the spare battery device, wherein the resilient object is an electric conductor; and
   a portable device coupled to the spare battery device, the portable device at least comprising:
      a second fixer unit, coupled to the first fixer unit, for fastening the spare battery device to the portable device;
      a plurality of input contact pads for receiving power from the spare battery device, wherein the location of each of the output contact pads of the spare battery device is associated with the location of each of the input contact pads of the portable device; and a conductive covering with a protrusion, wherein the location of the protrusion in the portable device is associated with the location of the resilient object in the spare battery device;

wherein, by adjusting the coupling relationship between the first fixer unit and the second fixer unit, the resilient object can be connected to the protrusion of the portable device, and each of the input contact pads of the portable device can be coupled to the corresponding output contact pad of the spare battery device, so that the power stored in the spare battery device can be outputted to the portable device; and wherein the first fixer unit is a screw, and the second fixer unit is a nut.

2. The portable electronic system according to claim 1, wherein the spare battery device further comprises:

a power storage unit for storing power; and a sensory control unit, coupled to the power storage unit, at least comprising:

a constant voltage source;

a resistor coupled to the constant voltage source and coupled to the resilient object at a first node; and a control unit, respectively coupled to the resistor and the resilient object at the first node, and coupled to the power storage unit, the output contact pads of the spare battery device being equipped in the control unit;

wherein, by adjusting the coupling relationship between the first fixer unit and the second fixer unit, the resilient object can be connected to the protrusion of the portable device, and each of the output contact pads of the spare battery device is coupled to the associated one of the input contact pads of the portable device, and the control unit is for controlling the output power of the power storage unit according to the voltage of the first node.

3. The portable electronic system according to claim 2, wherein the resilient object is a spring.

4. The portable electronic system according to claim 1, wherein the portable device is a mobile phone.

5. The portable electronic system according to claim 1, wherein the portable device is a notebook.

6. The portable electronic system according to claim 1, wherein the portable device is a Personal Digital Assistance (PDA).

7. A portable electronic system at least comprising:

a spare battery device, at least comprising:

a first fixer unit;

a power storage unit for storing power; and a sensory control unit coupled to the power storage unit, wherein the sensory control unit at least comprises:

a constant voltage source;

a resistor, coupled to the constant voltage source;

a resilient object coupled to the resistor at a first node, and protruding out from the spare battery device, wherein the resilient object is an electric, and a control unit coupled to the resistor and the resilient object at the first node, coupled to the power storage unit, and equipped with a plurality of output contact pads for outputting power from the spare battery device; and a portable device, coupled to the spare battery device, at least comprising:

a second fixer unit coupled to the first fixer unit, for fastening the spare battery device to the portable device;

a covering being electrically conductive, wherein the covering further comprises a protrusion and the location of the protrusion on the portable device is associated with the location of the resilient object of the spare battery device; and a plurality of input contact pads for receiving power from the spare battery device, wherein the location of each of the output contact pads on the spare battery device is associated with the location of each of the input contact pads of the portable device, wherein, by adjusting the coupling relationship between the first fixer unit and the second fixer unit, the resilient object can be connected with the protrusion, and each of the output contact pads of the spare battery device is coupled to the associated input contact pads of the portable device, and the control unit is for controlling the output power of the power storage unit according to the voltage of the first node.

8. The portable electronic system according to claim 7, wherein the resilient object is a spring.

9. The portable electronic system according to claim 7, wherein the first fixer unit is a screw, and the second fixer unit is a nut.

10. The portable electronic system according to claim 7, wherein the portable device is a mobile phone.

11. The portable electronic system according to claim 7, wherein the portable device is a notebook.

12. The portable electronic system according to claim 7, wherein the portable device is a Personal Digital Assistance (PDA).

* * * * *